Oct. 31, 1933.  E. G. BAER  1,933,157
CLUTCH FOR STOKERS
Filed Oct. 27, 1932
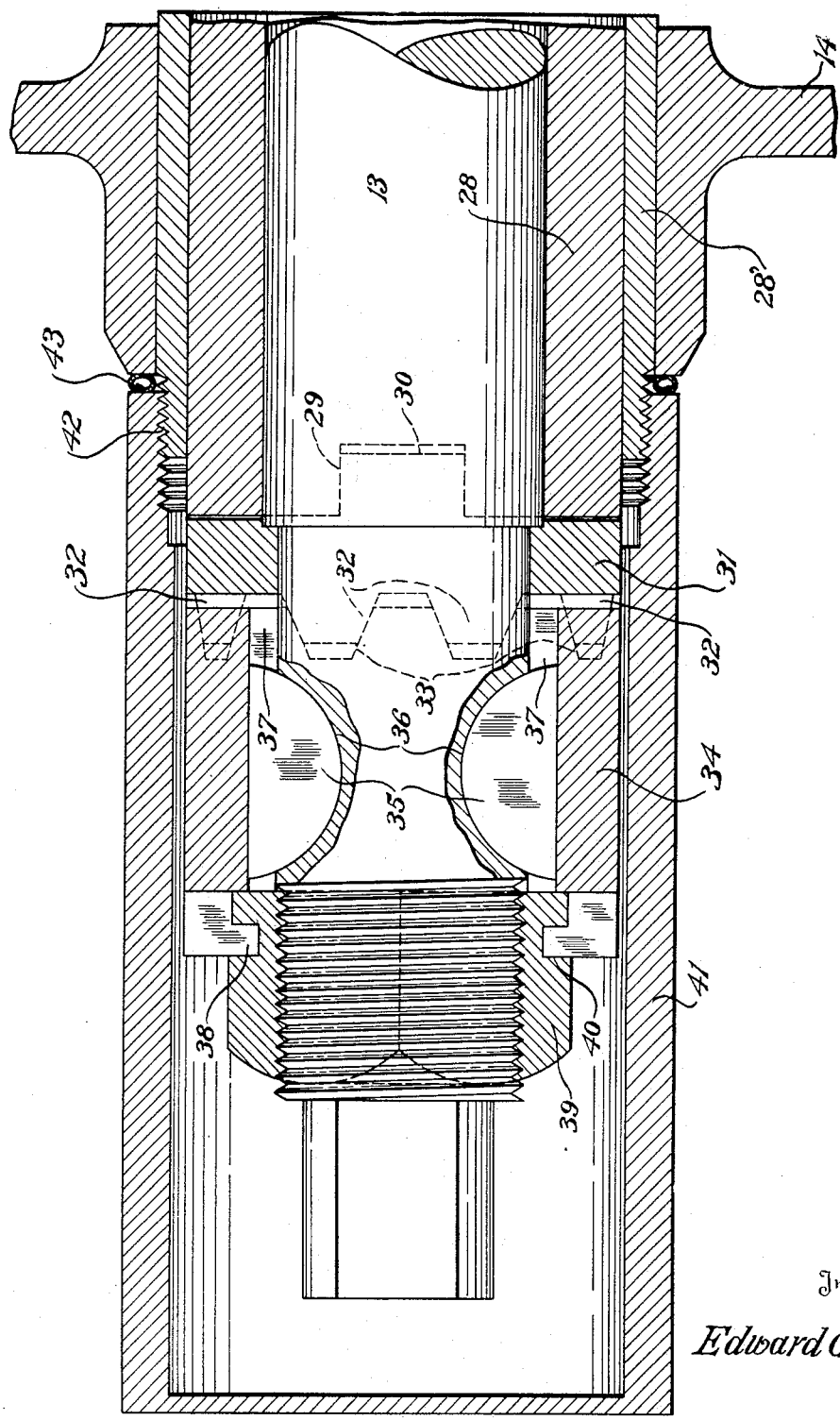
Inventor
*Edward G. Baer*
By *Frease and Bishop*
Attorneys Patented Oct. 31, 1933

1,933,157

UNITED STATES PATENT OFFICE 1,933,157

CLUTCH FOR STOKERS

Edward G. Baer, Orrville, Ohio, assignor to The Will-Burt Company, Orrville, Ohio, a corporation of Ohio Application October 27, 1932. Serial No. 639,855

11 Claims. (Cl. 287—53)

The invention relates to stoker mechanism and more particularly to a multiple jaw clutch adapted to disconnect the coal feed screw from the driving means of the stoker when the mechanism becomes jammed by foreign matter such as iron, wood, hard rock or the like lodging in the feed screw and feed tube of the stoker.

It is customary in coal stokers, because of foreign matter such as tramp iron, hard rock, wood, stones and the like finding its way into the coal, to provide some protection for the electric motor and mechanical parts of the stoker when the mechanism becomes jammed by such foreign matter lodging in the feed screw within the coal tube, in order to prevent burning out of the motor or breaking of the parts.

Such safety devices are generally in the form of a shear pin in the main or auxiliary shaft of the power unit of the stoker, this pin being adapted to be broken or sheared when the mechanism becomes jammed as above pointed out. When this pin is sheared, considerable annoyance is usually caused to the average user of the stoker, in replacing the pin, and it frequently results in a service call to the stoker dealer or factory in order to replace the shear pin so that the stoker may again operate.

The object of the present improvement is to eliminate the shear pin and the objections and disadvantages which accompany the same by providing a multiple jaw clutch upon the drive shaft of the stoker and an electric overload release in the circuit to the motor.

The above and other objects may be attained by constructing the invention in the manner illustrated in the accompanying drawing, in which The figure is a longitudinal sectional view of the multiple jaw clutch and associated parts.

Similar numerals refer to similar parts throughout the drawing.

The stoker to which the invention is applied may include a hopper from which the coal is conveyed as by a feed screw located within a coal tube which leads to the furnace.

The coal feed screw is operatively connected to the drive shaft 13 which is journaled in suitable bearings in the gear case 14. Any suitable source of power such as a motor may be provided for driving the shaft 13 through any suitable reducing gearing, as will be later described.

Freely journaled upon the shaft 13 is a sleeve 28 which extends through one side of the gear case and is journaled therein, means being provided in the gear case for rotating said sleeve at the desired speed, the rotation thereof being preferably intermittent as is customary and usual in stoker operation.

The sleeve 28 may be provided with one or more sockets 29 in its outer end, these sockets or notches being preferably located at diametrically opposite points and adapted to receive the lugs 30 upon the stationary clutch coupling 31.

The other end of the stationary clutch coupling is provided with a plurality of tapered teeth 32 adapted to engage similar teeth 33 in the movable clutch coupling 34 which is slidably and non-rotatably mounted upon the shaft 13 as by the Woodruff keys 35 located in suitable sockets 36 in the shaft and extended into longitudinal slots 37 in the movable clutch coupling 34.

The outer end of the movable coupling 34 is provided with the inturned annular flange 38 and one half of the same is cut away to permit the insertion of the nut 39 which is provided with the annular groove 40 in its periphery to receive the flange 38, and forming also a peripheral flange upon the nut to retain the flange 38.

A cylindric cap 41 may be provided for covering the parts above described upon the outer end of the drive shaft, said cap being threaded to the bushing 28' as indicated at 42 so that it may be easily and readily detached to permit access to the parts when desired. A gasket 43 may be provided at the inner end of the cap 41 in order to provide a tight seal to prevent coal dust and the like from entering the cap, as well as preventing oil leaking from the gear case.

Since this clutch or coupling replaces the usual shear pin protection, an electric overload release of any well known design may be provided in the circuit to the motor for protection of the motor when the piece of tramp iron, stone or the like becomes wedged in the feed screw and stops the operation thereof. This overload release cuts off the power to the motor when the machine is stopped due to an obstruction.

In the normal operation of the machine the sleeve 28 is intermittently rotated, and, through the couplings 31 and 34 and keys 35 the shaft 13 is intermittently rotated in unison with the ratchet wheel.

In the event an obstruction becomes wedged in the coal feed screw, which is directly connected to the drive shaft 13, stopping the rotation of the feed screw, the overload release will operate to cut off the power to the motor.

In order to release the obstruction, the double jaw clutch or coupling is then operated to disconnect the driving sleeve 28 from the shaft 13, which is directly connected to the coal feed screw, so as to permit the feed screw to be rotated backwards and thus release the obstruction.

In order to do this, the nut 39 is unscrewed sufficiently to pull the movable coupling 34 out of engagement with the fixed coupling 31, thus disconnecting the drive sleeve from the shaft and permitting the shaft to rotate freely as the feed screw is rotated in reverse direction.

After the obstruction is removed, the nut 39 is again tightened, moving the movable coupling 34 into engagement with the fixed coupling 31 and thus operatively connecting the shaft 13 to the drive sleeve 28. The overload release is then reset, starting the motor and causing the machine to operate as before.

From the above it will be seen that the annoyance and inconvenience of the usual shear pin is eliminated, making it unnecessary to call a service man from the stoker dealer or factory in order to restart the machine after the same has become jammed by foreign material lodging in the screw and feed tube; it being necessary only to remove the cap 41 and loosen the nut 39 in order to permit the feed screw to be rotated reversely to dislodge the foreign material, after which it is only necessary to tighten the nut 39, replace the cap 41 and reset the overload release.

I claim:

1. Stoker mechanism including a drive shaft operatively connected to a coal feed screw, a driving sleeve journaled upon said shaft, a fixed coupling upon the driving sleeve and provided with teeth, a movable coupling slidably keyed upon the shaft and having teeth adapted to mesh with the teeth upon the fixed coupling, and means for slidably moving the movable coupling out of engagement with the fixed coupling.

2. Stoker mechanism including a drive shaft operatively connected to a coal feed screw, a driving sleeve journaled upon said shaft, a fixed coupling upon the driving sleeve and provided with teeth, a movable coupling slidably keyed upon the shaft and having teeth adapted to mesh with the teeth upon the fixed coupling, and screw threaded means for slidably moving the movable coupling out of engagement with the fixed coupling.

3. Stoker mechanism including a drive shaft operatively connected to a coal feed screw, a driving sleeve journaled upon said shaft, a fixed coupling upon the driving sleeve and provided with teeth, a movable coupling slidably keyed upon the shaft and having teeth adapted to mesh with the teeth upon the fixed coupling, and a nut upon the shaft for slidably moving the movable coupling out of engagement with the fixed coupling.

4. Stoker mechanism including a drive shaft operatively connected to a coal feed screw, a driving sleeve journaled upon said shaft, a fixed coupling upon the driving sleeve and provided with teeth, a movable coupling slidably keyed upon the shaft and having teeth adapted to mesh with the teeth upon the fixed coupling, a nut upon the shaft, and interengaging flanges upon the nut and movable coupling.

5. Stoker mechanism including a drive shaft operatively connected to a coal feed screw, a driving sleeve journaled upon said shaft, a fixed coupling upon the driving sleeve and provided with teeth, a movable coupling slidably keyed upon the shaft and having teeth adapted to mesh with the teeth upon the fixed coupling, the outer end of the movable coupling being half cut away and having an annular, inturned flange, and a nut upon the shaft having a peripheral flange engaging said annular flange.

6. Stoker mechanism including a drive shaft operatively connected to a coal feed screw, a driving sleeve journaled upon said shaft and having notches at its outer end, a fixed coupling having lugs at its inner edge received in said notches and provided with teeth on its outer edge, a movable coupling slidably keyed upon the shaft and having teeth adapted to mesh with the teeth upon the fixed coupling, and means for slidably moving the movable coupling out of engagement with the fixed coupling.

7. Stoker mechanism including a drive shaft operatively connected to a coal feed screw, a driving sleeve journaled upon said shaft and having notches at its outer end, a fixed coupling having lugs at its inner edge received in said notches and provided with teeth on its outer edge, a movable coupling slidably keyed upon the shaft and having teeth adapted to mesh with the teeth upon the fixed coupling, and screw threaded means for slidably moving the movable coupling out of engagement with the fixed coupling.

8. Stoker mechanism including a drive shaft operatively connected to a coal feed screw, a driving sleeve journaled upon said shaft and having notches at its outer end, a fixed coupling having lugs at its inner edge received in said notches and provided with teeth on its outer edge, a movable coupling slidably keyed upon the shaft and having teeth adapted to mesh with the teeth upon the fixed coupling, and a nut upon the shaft for slidably moving the movable coupling out of engagement with the fixed coupling.

9. Stoker mechanism including a drive shaft operatively connected to a coal feed screw, a driving sleeve journaled upon said shaft and having notches at its outer end, a fixed coupling having lugs at its inner edge received in said notches and provided with teeth on its outer edge, a movable coupling slidably keyed upon the shaft and having teeth adapted to mesh with the teeth upon the fixed coupling, a nut upon the shaft, and interengaging flanges upon the nut and movable coupling.

10. Stoker mechanism including a drive shaft operatively connected to a coal feed screw, a driving sleeve journaled upon said shaft and having notches at its outer end, a fixed coupling having lugs at its inner edge received in said notches and provided with teeth on its outer edge, a movable coupling slidably keyed upon the shaft and having teeth adapted to mesh with the teeth upon the fixed coupling, the outer end of the movable coupling being half cut away and having an annular, inturned flange, and a nut upon the shaft having a peripheral flange engaging said annular flange.

11. Mechanism for use upon a stoker having a motor and an overload release connected to the motor and a coal feed screw, said mechanism including a drive shaft operatively connected to the coal feed screw, a driving sleeve journaled upon said shaft and operatively connected to the motor, a fixed coupling upon the driving sleeve and provided with teeth, a movable coupling slidably keyed upon the shaft and having teeth adapted to mesh with the teeth upon the fixed coupling, and means for slidably moving the movable coupling out of engagement with the fixed coupling.

EDWARD G. BAER.